(12) United States Patent
Putzolu et al.

(10) Patent No.: US 7,203,740 B1
(45) Date of Patent: Apr. 10, 2007

(54) METHOD AND APPARATUS FOR ALLOWING PROPRIETARY FORWARDING ELEMENTS TO INTEROPERATE WITH STANDARD CONTROL ELEMENTS IN AN OPEN ARCHITECTURE FOR NETWORK DEVICES

(75) Inventors: David Putzolu, Forest Grove, OR (US); Raj Yavatkar, Portland, OR (US); Bernard N. Keany, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,163

(22) Filed: Dec. 22, 1999

(51) Int. Cl.
*G06F 15/16* (2006.01)
*G06F 15/177* (2006.01)

(52) U.S. Cl. ............... 709/220; 709/217; 709/218; 709/221; 709/229

(58) Field of Classification Search .............. 709/202, 709/220, 238, 239, 240, 241, 242, 246, 250; 370/351–360
See application file for complete search history.

(56) References Cited

U.S. PATENT DOCUMENTS

| | | | | |
|---|---|---|---|---|
| 5,742,607 A | * | 4/1998 | Beighe et al. ............ 709/250 |
| 5,742,810 A | | 4/1998 | Ng et al. |
| 5,758,194 A | * | 5/1998 | Kuzma ..................... 709/246 |
| 5,903,731 A | | 5/1999 | Vincent et al. |
| 5,961,595 A | | 10/1999 | Kawagoe et al. |
| 6,115,747 A | * | 9/2000 | Billings et al. ............ 709/238 |
| 6,243,711 B1 | * | 6/2001 | Wu et al. |
| 6,393,496 B1 | * | 5/2002 | Schwaderer et al. ........ 709/328 |
| 6,401,132 B1 | * | 6/2002 | Bellwood et al. .......... 709/246 |
| 6,424,621 B1 | * | 7/2002 | Ramaswamy et al. ...... 709/220 |
| 6,434,618 B1 | * | 8/2002 | Cohen et al. ............... 709/238 |

FOREIGN PATENT DOCUMENTS

| | | |
|---|---|---|
| EP | 0946020 | 9/1999 |
| WO | 9957649 | 11/1999 |

\* cited by examiner

*Primary Examiner*—Rupal Dharia
*Assistant Examiner*—Quang N. Nguyen
(74) *Attorney, Agent, or Firm*—Blakely, Sokoloff, Taylor & Zafman LLP

(57) ABSTRACT

A computer system for allowing proprietary forwarding elements to interoperate with standard control elements in an open network architecture. The computer system comprises a forwarding element that is adapted to perform data forwarding functions in a computer network. A control element is adapted to perform network signaling and control functions in the computer network. The control element is adapted to generate a standardized data set for configuring the forwarding element. An interconnecting element operatively connects the forwarding element to the control element. A forwarding element plugin is integrated with the control element for receiving the standardized data set from the control element, translating the standardized data set into a specialized data set, and transmitting the specialized data set to the forwarding element to configure the forwarding element. The forwarding element utilizes the specialized data set to configure the forwarding element for performing data forwarding in the computer network.

19 Claims, 4 Drawing Sheets

VERTICAL PROPRIETARY NETWORKING ARCHITECTURE

100

- NETWORKING BOX LEVEL HARDWARE
  - PROPRIETARY APPLICATIONS
    - 130
  - PROPRIETARY NETWORK OPERATING SYSTEM
    - 120
  - CUSTOM SWITCH ASICs
    - 110

PRIOR ART

FIG. 1

HORIZONTAL OPEN NETWORKING ARCHITECTURE
200

THIRD-PARTY APPLICATIONS
250

OPEN API
240

CONTROL NETWORK OPERATING SYSTEM
(CONTROL ELEMENT)
230

OPEN API
220

NETWORKING MIDDLEWARE
214

FORWARDING SILICON
212

FOWARDING ELEMENT

METHOD AND APPARATUS FOR ALLOWING PROPRIETARY FORWARDING ELEMENTS TO INTEROPERATE WITH STANDARD CONTROL ELEMENTS IN AN OPEN ARCHITECTURE FOR NETWORK DEVICES

BACKGROUND OF THE INVENTION

1. Field of the Invention

The present invention relates to the field of computer systems, and more particularly, to a method and apparatus for allowing proprietary forwarding elements, such as special purpose networking hardware, to interoperate with standard control elements, generally implemented in software, in an open network architecture.

2. Background Information

In recent years, a trend has emerged in the networking hardware industry. Devices such as routers and switches have begun to evolve from monolithic, highly customized and integrated designs into aggregations of discrete, modularized components. The modularization of networking device architecture has begun to enable faster cycles of innovation and development in networking hardware and software by breaking the tight integration dependencies between the various components that make up a complex device, such as a router or switch. More recently, a further trend has emerged in the appearance of programmable ASICs (application-specific integrated circuits) or network processors. These devices allow for off-loading of application-layer or network-level packet processing from general purpose processors or servers to switches that include application-aware packet classification and processing capabilities. For example, a switch may not only perform routing lookup and forwarding in the hardware, but may also be able to perform functions of an application-level proxy and network or transport layer address translation. In order to take advantage of, and accelerate these trends, the use of a horizontal open networking architecture (see, for example, FIG. 2) seeks to standardize a set of APIs (application program interfaces) and protocols for separating the functionality typically associated with packet forwarding. Such functionality is usually implemented in special purpose hardware, which may be referred to as "forwarding elements". The functionality associated with network signaling and control, typically implemented in software on general purpose processing architectures, may be referred to as "control elements". The separation and standardization of networking device functionality, along with using control element and forwarding element components advocated by the horizontal open networking architecture, allows proprietary designs to continue to emerge while retaining the characteristics of openness, and further enabling innovation and rapid product development.

The separation of control and forwarding elements requires that a set of interfaces be developed for each component type. These interfaces expose the functionality of components to each other, allowing them to be integrated together in a working whole. For example, the functionality of application-aware switching capability in forwarding elements must be exposed to the control element via an open interface so that the control element can "program" the switch to off-load packet processing or forwarding functions in the data path. One way to expose such functionality is to define an abstract interface that describes switch capabilities in a generic manner. The control element can use such an abstract interface to configure or manipulate the switching functions using abstract commands/operations to achieve the desired effect, and the forwarding element must translate these abstract commands into hardware-specific tasks. The hardware-specific capability thus abstracted can cover a wide range of hardware capabilities, including ASIC-specific formatting of forwarding tables, packet queuing parameters, and per-packet processing actions such as encryption, marking, or address translation.

Exposure of the capabilities of the forwarding and control elements via interfaces has certain drawbacks. In particular, interface specifications typically reflect underlying implementations. This is generally true in the case of forwarding elements, which tend to be cost-sensitive, highly task-specific devices. In such devices, reflecting the underlying functionality in a highly abstract manner requires extra processing power (and thus cost) on the part of the forwarding element. The cost-sensitivity of these devices tends to discourage the use of abstract interfaces, instead leading to highly specific interfaces that closely match the actual implementation of each forwarding element. When building proprietary systems, where each component may be designed and built by the same manufacturer, this exposure is acceptable, because confidential information about the underlying implementation is kept within the company. However, when components from different vendors are integrated, particularly when using an open architecture, this exposure becomes problematic in that it can make visible information about the forwarding element architecture and capabilities that would not otherwise be available.

SUMMARY OF THE INVENTION

In an embodiment of the present invention, a computer system allows proprietary forwarding elements to interoperate with standard control elements in an open network architecture. The system includes a forwarding element that is adapted to perform data forwarding functions in a computer network. A control element is adapted to perform network signaling and control functions in the computer network. The control element is adapted to generate a standardized data set for configuring the forwarding element. An interconnecting element operatively connects the forwarding element to the control element. A forwarding element plugin is integrated with the control element for receiving the standardized data set from the control element, translating the standardized data set into a specialized data set, and transmitting the specialized data set to the forwarding element to configure the forwarding element. The specialized data set is utilized to configure the forwarding element for performing data forwarding in the computer network.

BRIEF DESCRIPTION OF THE DRAWINGS

FIG. 1 illustrates an example of a vertical proprietary networking architecture of a prior art networking device;

FIG. 2 illustrates a horizontal open networking architecture according to an embodiment of the present invention;

DETAILED DESCRIPTION OF THE INVENTION

Figure 3:
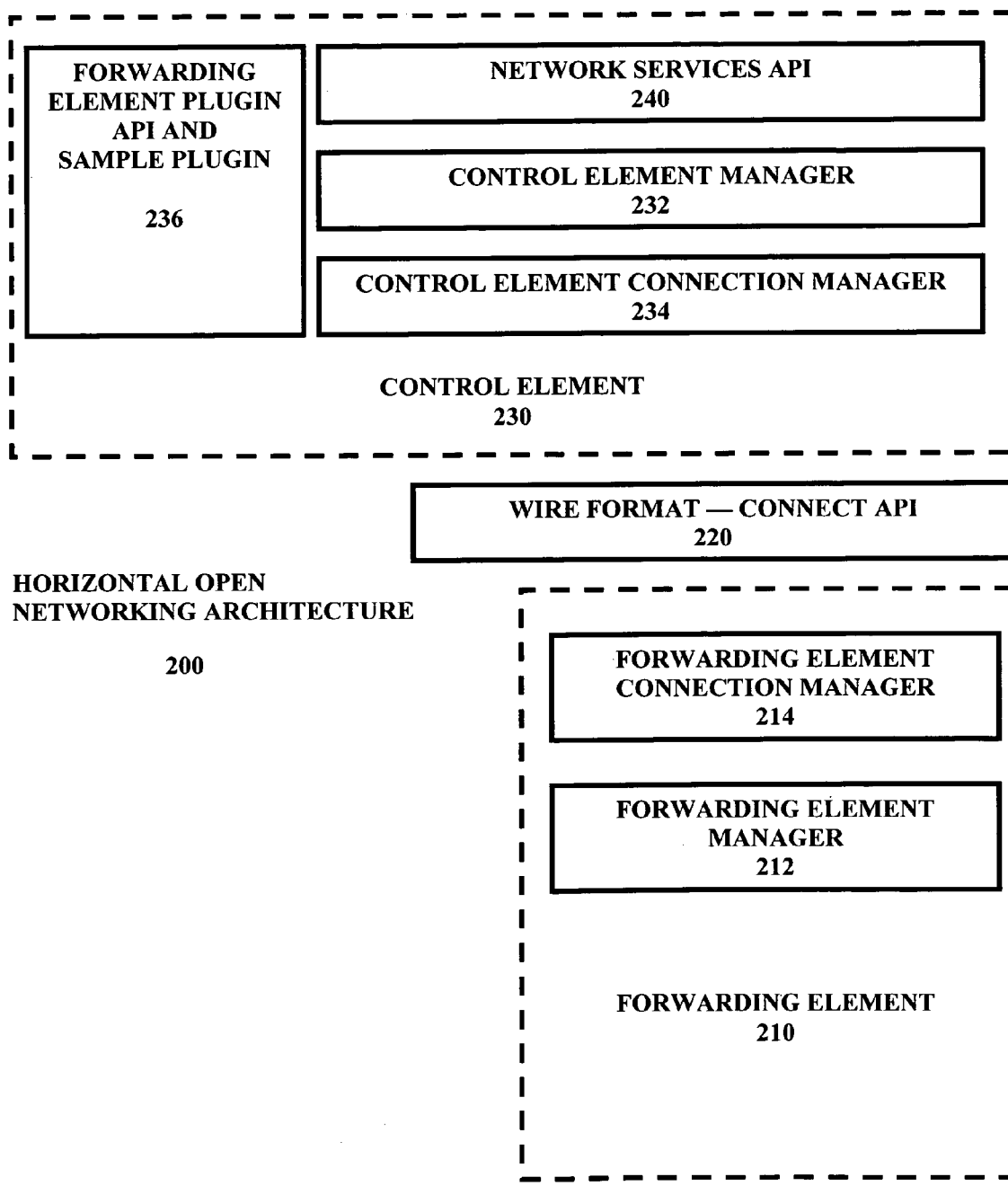
FIG. 3 illustrates the main components of a horizontal open networking architecture according to an embodiment of the present invention.

FIG. 1 illustrates an example of a vertical proprietary networking architecture of a prior art networking device. In the networking box level hardware 100 example provided in FIG. 1, an equipment vendor typically uses a proprietary network operating system (NOS) 120 with its proprietary interfaces at the bottom of the networking box level hardware 100 (interfaces to underlying ASICs (application-specific integrated circuits), switch fabric, or bus 110) and the top of the networking box level hardware 100 (interfaces that expose hardware state and functionality so that network services and applications can be written 130). Therefore, third party independent software vendors (ISVs) or independent hardware vendors (IHVs) cannot provide value-added software or hardware solutions without first having access to these private interfaces. For example, an independent software vendor may have a "best-of-the-breed" firewall or intrusion detection software, but the independent software vendor cannot bring it to market without either investing in a complete, vertical solution, or getting cooperation from an established network equipment vendor. In the latter case, the independent software vendor must work with multiple vendors and their multiple proprietary interfaces to port its application to individual platforms. Similarly, an independent hardware vendor with the next-generation forwarding hardware must either invest in a complete, vertical solution, or wait for an established vendor to adopt its hardware solution. Moreover, even an established hardware vendor typically has many different platforms that use different network operating systems and architectures. Thus, introducing a new hardware or software functionality requires substantial efforts and investment. In summary, the vertical integrated architecture shown in FIG. 1 stifles innovation and makes it difficult to exploit new hardware and software capabilities.

The three main components 110, 120, 130 of the networking architecture shown in FIG. 1, though inter-dependent, perform functions that are largely independent of each other. At the bottom is the forwarding hardware 110 that operates in the data-forwarding plane and is responsible for per-packeting processing and handling. In the middle is the network operating system 120 that is mainly responsible for operations in the control plane and runs routing, signaling, and network control protocols. The network operating system 120 also dictates the forwarding behavior of the underlying hardware 110 by manipulating forwarding tables, per-flow QoS (quality of service) tables, and access control lists for the forwarding interfaces. At the top is a set of applications and/or services 130 that mainly perform network management and control functions. In some cases, some of these applications may also perform per-packet processing. For example, an application-level proxy may handle each data packet that matches a particular description. However, in most cases, these applications mainly influence the data forwarding decisions by "programming" the forwarding hardware appropriately.

FIG. 2 illustrates a horizontal open networking architecture according to an embodiment of the present invention. The chief aim of a horizontal open networking architecture as in FIG. 2 is to standardize the interfaces among the components shown in FIG. 1 so that innovation at each level can accelerate and can facilitate independent hardware vendors to bring new capabilities to the market as soon as possible. The horizontal open networking architecture 200 of FIG. 2 preferably has three main components—the forwarding element 210, the control element 230, and the network services/applications 250—as well as two open interfaces 220, 240. The horizontal open networking architecture 200 essentially separates the control plane from the data forwarding plane. The control element 230 handles all of the control functions, including routing and signaling protocols, whereas the forwarding element 210 is responsible for forwarding and processing data packets.

Consider, for example, a L3 switch implemented using the horizontal open networking architecture 200 of FIG. 2. In such a switch, the control element 230 runs the necessary routing protocols (RIP (routing information protocol), OSPF (open shortest path first), etc.) and downloads the forwarding tables to the switching fabric or interfaces so that the forwarding silicon 212 (of the forwarding element 210) can forward the data packets at wire-speed. The forwarding silicon is "programmed" to deliver all control traffic (IGMP (internet group multicast protocol) queries, RSVP ("please reply") packets, and routing updates) to the control element 230.

The interface 220 between the control and forwarding elements is designed such that either element can be replaced without affecting the other. The networking middleware 214 (of the forwarding element 210) is responsible for converting the generalized configuration and control information received via the interface 220 into the specific structures necessary to properly manipulate the state of the forwarding silicon.

The control element 230 and interface 240 exposed at the top of the forwarding element 210 performs a similar function, providing an open, standardized manner of building value-added networking services and applications. The interface 240 abstracts out and exposes the hardware-specific functionality so that these services can exploit the hardware capabilities to implement services such as policy-based networking, security (internal or external firewalls, proxies, intrusions detection, etc.), QoS (quality of service), and even functions such as load-balancing for web servers. For example, a network service may use the interface to download a policy rule that specifies the action to be taken based on a stateful inspection of packets in the forwarding path within the forwarding element 210. The control element 230 takes care of converting the abstract rule representation into a concise set of commands and configuration information to download to the forwarding element 210.

In addition to providing a standardized method of building value-added services and applications, the interface 240 enables the services to access control or management states (e.g., device-specific configuration, route/path management, topology discovery and database) so that they can provide network-wide services. More complex network management tools and services, such as event-triggered management, traffic management, and policy-based networking could be built on top of this interface.

The clear-cut functional separation of device functionality and the open nature of these interfaces 220, 240 allows the horizontal open networking architecture 200 to be realized in a variety of configurations. Just like in a traditional switch/router, a control CPU in the box can host the control element 230 and services 250 with the forwarding element 210 and control element 230 connected by a bus. Alternatively, in the case of a chassis with a high-speed backplane and several data forwarding planes, the control element 230 may reside in a separate plane plugged into the same backplane. In this configuration, each of the network services 250 may run on a separate service appliance that also plugs into the same backplane yielding a distributed architecture. In yet another distributed configuration, the control and forwarding elements 230, 210, respectively, may not be physically co-located at all, but, instead, separated by a network (Ethernet, ATM VC (asynchronous transfer mode), or other interconnection technology). In this case, a central server hosts the control element 230 and interacts with the forwarding element 210 across the network. The control server itself may be responsible for control of one or more forwarding elements 210. An example configuration consists of a wire closet with eight switches responsible for switching traffic to/from a floor in a large building. Under the horizontal open networking architecture 200 shown in FIG. 2, a single control element 230 running on a dedicated server may be responsible for providing the control functionality for the eight switches.

Another example of a distributed configuration is a control element 230 within a service provider cloud that is responsible for controlling one or more forwarding elements 210 residing at customer premises. ADSL (asymmetric digital subscriber line) modems with the ability to route and differentiate among different traffic streams may be controlled remotely from a service provider using the horizontal open networking architecture 200 shown in FIG. 2, allowing the service provider to offer simplified management and value-added services to its customers.

Finally, the horizontal open networking architecture 200 also allows network services 250 to be hosted separately from the control element 230. In this configuration, the service uses a "remoteable" version of the open interface 240 at the top to interact with the control element 230.

FIG. 3 illustrates the main components of a horizontal open networking architecture according to an embodiment of the present invention. The horizontal open networking architecture 200 of FIG. 3 consists of four major components: (1) the network services API (application program interface) 240, the control element 230, the forwarding element 210, and the connect API 220. The forwarding element 210 and the control element 230 may be connected by a bus, a high-speed backplane, or a network link. The connect API 220 represents the standard interface between the two elements 210, 230 and hides the details of interaction across these interconnections. In the case of a network link, the connect API 220 is implemented using a standardized wire-format protocol.

The network services API 240 allows the horizontal open networking architecture 200 and platform to be visible to external parties, such as third-party independent software vendors. The network services API 240 makes the hardware-specific functionality of the data forwarding elements 210 (such as switches, routers, and network interface cards (NICs)) available to the application programmers in a uniform, hardware-independent manner. Third party independent software vendors that write network-aware applications, such as VoIP (voice-over internet protocol) gateways, intrusion detection, application-specific proxies, and VPN (virtual private network) servers, use the network service API 240 to control/modify the behavior of the data forwarding path in both the data and control planes. For example, in the case of a L3/L4 switch with the ability to filter packets based on pre-specified packet filters, an H.323 (H.323, Packet-Based Multimedia Communication Systems, International Telecommunication Union, February 1998) proxy uses the network services API 240 to direct the forwarding elements 210 to intercept and forward H.323-related packets to itself for further processing. However, in the case of a L4/L7 switch with the capability of stateful inspection of data packets at wire-speed, an intrusion detection application could install a policy rule in the forwarding element 210 that specifies the classification filter and the associated actions for examining session state and identifying an "intrusion signature". In the horizontal open networking architecture 200 according to an embodiment of the present invention, the control element 230 hosts the network services API 240 implementation and hides the details of translating the network services API 240 calls to appropriate message passing and invocations of hardware-specific calls at the forwarding element 210.

The forwarding element 210 of the horizontal open networking architecture 200 according to the present invention handles the data or packet forwarding functions. Examples of forwarding elements 210 include switches (including a Layer 2 bridge), routers, and network adapters (network interface cards). A forwarding element 210 typically has one or more network interfaces and is responsible for handling incoming packets and forwarding them over one or more outgoing interfaces. The forwarding element 210 may include a variety of capabilities, including L2/L3 forwarding, packet classification, and filtering based on L4 (or higher) layer information in packets, data encryption, and policy enforcement. In the horizontal open networking architecture 200 according to the present invention, the forwarding element 210 relies on the control element 230 to handle the usual management and control functions, such as routing and signaling protocols, interface to value-added applications, etc. The forwarding element 210 exports its capabilities and specific functions to the control element 230 with the use of the connect API 220.

Within the forwarding element 210, there may be a forwarding element manager 212 adapted to handling interactions with the control element 230, making the hardware services, such as packet forwarding, QoS (quality of service), monitoring, access control, and policy enforcement, visible to the control element 230. For example, the forwarding element manager 212 may use the services of a forwarding element connection manager 214 to establish communication with the control element 230 and accept packet-forwarding tables from the control element 230. The forwarding element connection manager 214 within the forwarding element 210 may be adapted to handle all of the details of communication with the control element 230, including discovering and binding with a particular control element 230 over a specific transport medium and handling ongoing interconnection issues and data exchange.

The control element 230 of the horizontal open networking architecture 200 according to the present invention preferably has three main components: (1) the control element manager 232; (2) the control element connection manager 234, and the forwarding element plugin API and sample plugin 236. The control element manager 232 represents the "brains" of the horizontal open networking architecture 200 in the sense that it implements most of the control plane functionality, supports the network services API 240, and handles the interactions with the many different kinds of forwarding elements 210 through a forwarding element-specific plugin API and sample plugin 236. The control element connection manager 234 corresponds to the forwarding element connection manager 214, and it handles the details of communication with controlled forwarding elements 210, including the specifics of dealing with the particular transport mediums.

The control element 230 performs a variety of control functions on behalf of the forwarding elements 210 within its control. For instance, it runs routing protocols on their behalf. For an external observer, the control element 230 and its forwarding elements 210 look just like a traditional router. Given a set of ports on one or more forwarding elements 210, the control element 230 can aggregate them and represent them as a single, virtual router. The control element 230 takes care of generating routing protocol exchanges based on the observed state of the interfaces of forwarding elements 210. Furthermore, the control element 230 may create and represent more than one virtual router at a time by aggregating ports on the forwarding elements into different groups where each group looks like a separate router to an external observer. Such a capability is very useful for administrative purposes, as well as to dynamically build forwarding domains for the purpose of access control, etc.

The horizontal open networking architecture 200 according to the present invention allows for the forwarding element platform-specific functionality to be available to the control element manager 232 and to independent software vendors through the network services API 240. However, the API and its implementation must do two things: (1) convert the API calls into invocations of hardware-specific functionality in the forwarding element 210, and at the same time, (2) allow hardware vendors the ability to differentiate by exposing any hardware-specific features through the API without divulging their intellectual property. An example of the second aspect is a forwarding element platform that allows the application writers to download code for stateful inspection of packet contents. Another example of a forwarding element-specific functionality is the use of a specialized hashing algorithm to precompute forwarding and flow tables for the forwarding element 210. Depending on the ASICs (application-specific integrated circuits) or custom forwarding silicon used, each hardware vendor typically uses its own customized table format and lookup algorithm to facilitate wire-speed forwarding and per-flow queuing. A hardware vendor would be reluctant to expose the internal details of such algorithms to the control element 230. Instead, the vendor might choose to perform this computation on the control element 230, and then download a customized table to the forwarding element 210.

Therefore, the forwarding element plugin API and sample plugin 236 allows an independent hardware vendor to provide a software module that captures the hardware-specific functionality and "plug-in" that module into the control element manager 232. The control element manager 232, in turn, uses the plugin module 236 to expose the hardware-specific functionality through the network services API 240 and map the network services API calls to hardware-specific functions supported by the module. For example, the forwarding element plugin API and sample plugin 236 allows the vendor to supply a set of extensions to the network services API 240 for custom functionality that is not covered by the predefined functionality exposed in the network services API 240. Also, the plugin capability allows the vendor to supply its own code that can take the forwarding or flow tables prepared by the control element 230 and format them into the form needed by its ASICs before the control element 230 transmits the tables to the forwarding element 210.

The connect API 220 interface abstracts the functionality of the forwarding elements 210 so that the capabilities of the forwarding elements 210 can be remotely configured and controlled by the control element 230. The connect API 220 defines the standard features that are expected to be found in all types of forwarding elements 210, such as basic monitoring functionality, as well as features expected to be supported by only a subset of the forwarding elements 210 (such as L3 switching, or encryption). The connect API 220 may also include a provision for passing opaque information to forwarding elements 210 in order to allow inclusion of unanticipated or vendor-specific functionality. The connect API 220 may include a capability negotiation mechanism between the control element 230 and forwarding elements 210 to allow discovery of forwarding element features by the control element 230.

The connect API 220 itself includes the basic communication primitives along with methods for examining and manipulating the status of the underlying transport in a transport independent manner. The connect API 220 may be implemented over a variety of transports, such as PCI (peripheral component interconnect), input/output backplane, Ethernet, or ATM (asynchronous transfer mode). Depending on the transport, a transport-specific module specifies exactly how the connect API UDPs (user datagram protocols) are encapsulated on specific interconnect technologies, as well as how to deal with normal and exception conditions in the operation of the interconnect technology. Two examples of transports include PCI and IP. The IP transport is preferably used over the Ethernet or ATM, and can be implemented using either UDP (user datagram protocol) or TCP (transmission control protocol) as transport protocols. The use of these protocols, however, does not preclude the possibility of using native ATM or Ethernet transport for implementation of the connect API 220.

Figure 4:
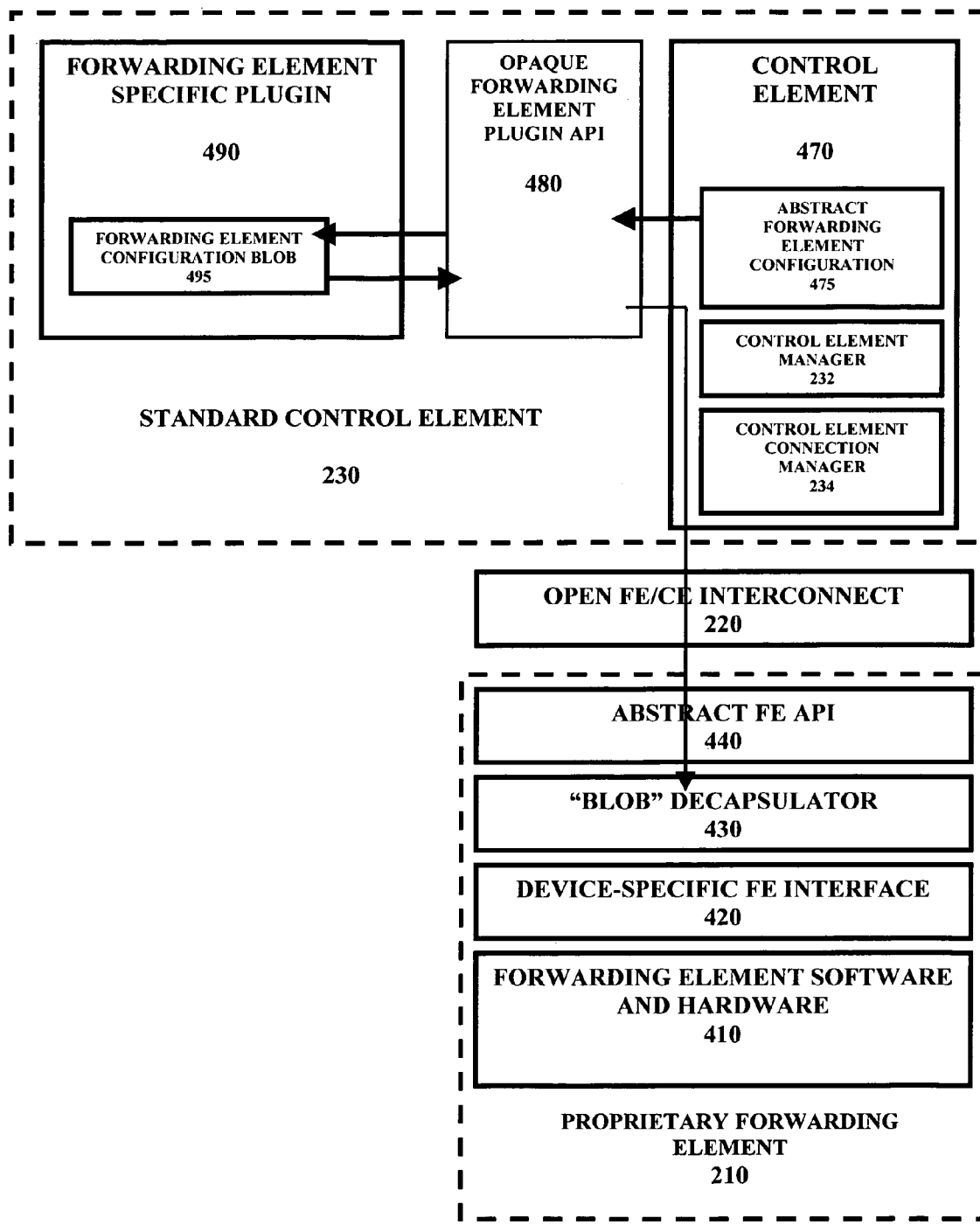
FIG. 4 illustrates a diagram of a forwarding element and a control element according to an embodiment of the present invention.

FIG. 4 illustrates a diagram of a forwarding element and a control element according to an embodiment of the present invention. As illustrated in FIG. 4, the standard control element 230 includes three major components: (1) the control element 470, which includes the control element manager 232 and the control element connection manager 234 as illustrated in FIG. 3; (2) the opaque forwarding element plugin API 480; and (3) the forwarding element specific plugin 490. The proprietary forwarding element 210 as illustrated in FIG. 4 includes four major components: (1) the forwarding element software and hardware 410; (2) the device-specific forwarding element interface 420; (3) the "BLOB" decapsulator 430; and (4) the abstract forwarding element API 440. The standard control element 230 and the proprietary forwarding element 210 are interconnected by the open forwarding element/control element interconnect 220.

In utilizing the horizontal open networking architecture 200 of the present invention, a forwarding element vendor includes with the forwarding element hardware device 210 a software plugin 480, 490 for use with the forwarding element hardware device 210. The software plugin, which includes the forwarding element-specific plugin 490 and the opaque forwarding element plugin API 480, is installed onto the standard control element 230 and becomes integrated with the standard control element 230. Because the standard control element 230 utilizes open APIs—such as the open forwarding element/control element interconnect 220 and the abstract forwarding element API 440—there is no overhead of translating abstract forwarding element API calls to the native format of the proprietary forwarding element 210.

Therefore, the control element 470 is adapted to generate an abstract forwarding element configuration (i.e., a standardized data set) 475 for configuring the proprietary forwarding element 210. The abstract forwarding element configuration 475 is a standardized data set within the horizontal open networking architecture 200 which provides for conformity for data transactions in the development of the products by independent software vendors as well as independent hardware vendors. The abstract forwarding element configuration 475 is preferably passed to the opaque forwarding element plugin API 480, which then passes the abstract forwarding element configuration 475 to the forwarding element-specific plugin 490. The opaque forwarding element plugin API 480 performs the tasks of relaying the abstract forwarding element configuration 475 (the standardized data set) from the control element 470 to the forwarding element-specific plugin 490, and relaying a forwarding element-specific configuration BLOB (binary large object) 495 (the specialized data set) from the forwarding element-specific plugin 490 to the proprietary forwarding element 210.

The forwarding element-specific plugin 490 provided by the forwarding element vendor is adapted to perform the translation of the abstract forwarding element configuration (the standardized data set) 475 into a specialized data set, preferably, a forwarding element-specific configuration BLOB 495. The forwarding element-specific plugin 490 is preferably a dynamic linkable library (DLL) in binary form. Because the forwarding element-specific plugin 490 executes on the standard control element 230, the need for additional processing power on the proprietary forwarding element 210 is avoided.

The forwarding element-specific configuration BLOB (specialized data set) 495, contains the forwarding element-specific invocations of functionality that is specific to the proprietary forwarding element 210. By utilizing the forwarding element-specific plugin 490 to translate a standardized data set into a specialized data set, the proprietary forwarding element 210 implementations need not be exposed. Therefore, the proprietary design and architecture information are kept confidential. Because the forwarding element-specific plugin 490 is in binary form, the transformation process from the standardized data set to the specialized data set is essentially hidden from other components, thus protecting the proprietary forwarding element 210 implementation. A tremendous amount of complex reverse engineering would be required in order to determine the translation process from the forwarding element specific plugin DLL file.

Once the forwarding element-specific configuration BLOB 495 is generated, it is preferably passed back to the opaque forwarding element plugin API 480, which then transmits the BLOB 495 to the proprietary forwarding element 210. The BLOB 495 is preferably passed through the open forwarding element/control element interconnect 220, then to the abstract forwarding element API 440, and then finally to the BLOB decapsulator 430. The BLOB decapsulator 430 takes the BLOB 495 and "decapsulates" it—which is a very simple computational operation—and passes the decapsulated BLOB data directly to the device-specific forwarding element interface 420. The device-specific forwarding element interface 420 takes the information from the decapsulated BLOB data to configure the forwarding element software and hardware 410 to properly operate the proprietary forwarding element 210. In this manner, confidential information about the proprietary forwarding element's architecture that is present in the device-specific forwarding element interface 420 is never exposed to the standard control element 230, allowing independent hardware vendors of the forwarding elements to protect their intellectual property.

Additionally, encryption may be utilized to further protect the specialized data set that is passed from the standard control element 230 to the proprietary forwarding element 210. The specialized data set (i.e., the forwarding element-specific configuration BLOB 495) may be encrypted once it has been translated from the standardized data set (abstract forwarding element configuration 475). The encrypted specialized data set would be passed to the proprietary forwarding element 210, and then decrypted at the proprietary forwarding element 210. However, the use of encryption adds additional hardware to the proprietary forwarding element 210 in order to perform the decryption process.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A computer system comprising:
   a forwarding element to perform data forwarding in a computer network, the forwarding element configurable with device-specific instruction;
   a control element to perform network signaling and control in the computer network, the control element outputting non-device-specific instructions to configure the forwarding element;
   an interconnecting element operatively connecting the forwarding element to the control element;
   a forwarding element plugin integrated with the control element to conceal from the control element a configuration interface of the forwarding element by receiving the non-device-specific instructions from the control element, translating the non-device-specific instructions into the device-specific instructions of the forwarding element, and transmitting the device-specific instructions to the forwarding element, wherein the forwarding element utilizes the device-specific instructions to configure the forwarding element for performing data forwarding in the computer network; and
   an opaque forwarding element plugin integrated with the control element for receiving the non-device-specific instructions from the control element and transmitting the non-device-specific instructions to the forwarding element plugin, and for receiving the translated, device-specific instructions from the forwarding element plugin and transmitting the device-specific instructions to the forwarding element.

2. The computer system according to claim 1, wherein the device-specific instructions are transmitted in the form of a binary large object.

3. The computer system according to claim 1, wherein the forwarding element further includes a decapsulator that receives the device-specific instructions and decapsulates them into data readable by a device-specific forwarding element interface of the forwarding element to configure the forwarding element.

4. The computer system according to claim 1, wherein the device-specific instructions are transmitted to a decapsulator in the forwarding element for decapsulating the device-specific instructions.

5. The computer system according to claim 1, wherein the device-specific instructions are encrypted before transmission to the forwarding element, and the encrypted device-specific instructions are decrypted at the forwarding element.

6. The computer system according to claim 1, wherein the forwarding element plugin is a dynamic link library.

7. The computer system of claim 1, wherein the forwarding element is remotely located from the control element.

8. The computer system of claim 1, wherein the device-specific instructions are indicative of the design or hardware implementation of the forwarding element.

9. A method for configuring a computer device, the method comprising:

generating non-device-specific instructions by a control element that performs network signaling and control functions for configuring a forwarding element that performs network packet forwarding functions;

transmitting the non-device-specific instructions from the control element to a forwarding element plugin integrated with the control element, the forwarding element plugin to conceal from the control element a configuration interface of the forwarding element; translating the non-device-specific instructions into device-specific instructions specialized for the forwarding element; and transmitting the device-specific instructions to the forwarding element for configuring the forwarding element, wherein receiving the non-device-specific instructions from the control element and transmitting the non-device-specific instructions to the forwarding element plugin by an opaque forwarding element plugin integrated with the control element, and wherein receiving the translated, device-specific instructions from the forwarding element plugin and transmitting the device-specific instructions to the forwarding element by said opaque forwarding element plugin.

10. The method according to claim 9, wherein the forwarding element is adapted to perform data forwarding in a computer network.

11. The method according to claim 9, wherein the control element is adapted to perform network signaling ad control in a computer network.

12. The method according to claim 9, further including:

decapsulating the device-specific instructions into data readable by a device-specific forwarding element interface of the forwarding element for configuring the forwarding element.

13. The method according to claim 9, wherein the device-specific instructions are sent in the form of a binary large object.

14. The method according to claim 9, further including:

encrypting the device-specific instructions before transmitting them to the forwarding element; and decrypting the device-specific instructions at the forwarding element.

15. The method according to claim 9, wherein the forwarding element plugin is a dynamic link library.

16. An article comprising a machine-readable medium storing instructions that, when executed by a processor, the instructions perform:

concealing from a control element a configuration interface for a forwarding element by integrating a forwarding element plugin with the control element;

receiving non-device-specific instructions, generated by the control element, for configuring the forwarding element;

translating the non-device-specific instructions, by the forwarding element plugin, into device-specific instructions specialized for the forwarding element; and transmitting the device-specific instructions to the forwarding element for configuring the forwarding element, wherein receiving the non-device-specific instructions from the control element and transmitting the non-device-specific instructions to the forwarding element plugin by an opaque forwarding element plugin integrated with the control element, and wherein receiving the translated, device-specific instructions from the forwarding element plugin and transmitting the device-specific instructions to the forwarding element by said opaque forwarding element plugin.

17. The article according to claim 16, wherein the instructions further perform:

encrypting the device-specific instructions before transmission to the forwarding element.

18. The article according to claim 16, wherein the device-specific instructions are transmitted in the form of a binary large object.

19. The article according to claim 16, wherein the machine-readable medium includes a dynamic link library.

* * * * *